(12) United States Patent
Katoh et al.

(10) Patent No.: US 8,602,935 B2
(45) Date of Patent: Dec. 10, 2013

(54) LUBRICATION OF A PLANETARY GEAR DEVICE

(75) Inventors: Shingo Katoh, Toyota (JP); Masabumi Nishigaya, Nagoya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 283 days.

(21) Appl. No.: 13/254,353

(22) PCT Filed: Mar. 1, 2010

(86) PCT No.: PCT/IB2010/000409
§ 371 (c)(1),
(2), (4) Date: Sep. 1, 2011

(87) PCT Pub. No.: WO2010/100541
PCT Pub. Date: Sep. 10, 2010

(65) Prior Publication Data
US 2011/0319215 A1 Dec. 29, 2011

(30) Foreign Application Priority Data
Mar. 2, 2009 (JP) .................. 2009-047749

(51) Int. Cl.
*F16H 57/04* (2010.01)
(52) U.S. Cl.
USPC .......................................... 475/159; 184/6.12
(58) Field of Classification Search
USPC ............ 475/159, 160; 74/467, 468, 608, 609; 184/6.12, 11.1
See application file for complete search history.

(56) References Cited

U.S. PATENT DOCUMENTS

| 3,529,698 A | | 9/1970 | Nelson |
| 5,799,744 A | * | 9/1998 | Yamaguchi et al. ..... 180/65.235 |
| 6,575,865 B2 | * | 6/2003 | Takenaka et al. ................. 475/5 |
| 8,261,883 B2 | * | 9/2012 | Ariga et al. ................... 184/13.1 |
| 2006/0137939 A1 | * | 6/2006 | Smolong et al. ............. 184/6.12 |
| 2007/0261922 A1 | * | 11/2007 | Mullen et al. ................ 184/6.12 |
| 2011/0192245 A1 | * | 8/2011 | Shioiri et al. ................... 74/467 |

FOREIGN PATENT DOCUMENTS

| JP | 04-272561 A | 9/1992 |
| JP | 08-324262 A | 12/1996 |
| JP | 2002-120575 A | 4/2002 |

(Continued)

OTHER PUBLICATIONS

International Search Report mailed Jul. 23, 2010 in PCT/IB2010/000409 & Written Opinion.

(Continued)

*Primary Examiner* — Roger Pang
(74) *Attorney, Agent, or Firm* — Kenyon & Kenyon LLP

(57) ABSTRACT

A vehicle motive power transmission apparatus includes: a planetary gear device; an oil pump for sucking oil present in an apparatus case; a one-way clutch that transmits normal-direction rotation output of the planetary gear device to the oil pump, but does not transmit reverse-direction rotation output of the planetary gear device to the oil pump; an oil tank which is provided in the apparatus case, and which is provided with a first introduction portion that receives oil that is splashed upward as a gear in the apparatus case rotates in a normal direction, and a second introduction portion that receives oil that is splashed upward as the gear rotates in a reverse direction; and an oil passageway that supplies the planetary gear device with oil present in the oil tank or oil sucked by the oil pump.

7 Claims, 4 Drawing Sheets

(56) References Cited

FOREIGN PATENT DOCUMENTS

| JP | 2003-130189 A | 5/2003 |
| JP | 2004-180477 A | 6/2004 |
| JP | 2004-204949 A | 7/2004 |
| JP | 2005-201316 A | 7/2005 |
| JP | 2007-195320 A | 8/2007 |

OTHER PUBLICATIONS

Office Action in JP 2009-047749 drafted Dec. 8, 2010 and English translation thereof.

* cited by examiner

F I G . 2
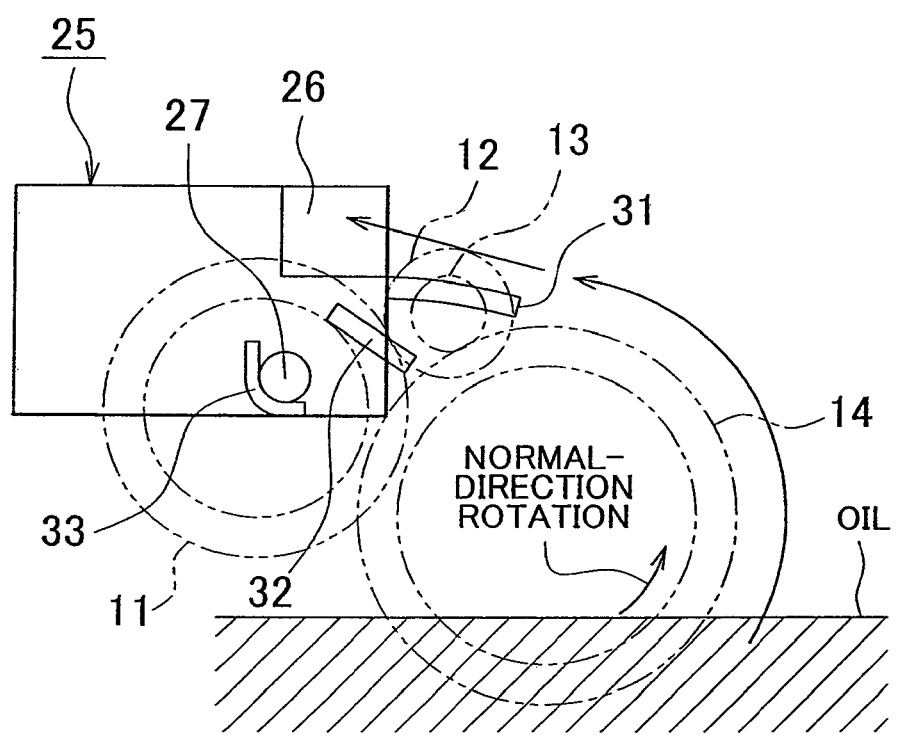

LUBRICATION OF A PLANETARY GEAR DEVICE

This is a 371 national phase application of PCT/IB2010/000409 filed 1 Mar. 2010, claiming priority to Japanese Patent Application No. 2009-047749 filed 2 Mar. 2009, the contents of which are incorporated herein by reference.

BACKGROUND OF THE INVENTION

1. Field of the Invention

The invention relates to a motive power transmission apparatus for a vehicle which transmits rotation power that is generated by a motive power source to an output side via a planetary gear device. In particular, the invention relates to a technology of supplying oil to such a planetary gear device.

2. Description of the Related Art

There have been motive power transmission apparatuses for vehicles which transmit rotation power generated by, for example, an electric motor, to wheels via a planetary gear device (e.g., see Japanese Patent Application Publication No. 2007-195320 (JP-A-2007-195320)).

Regarding a related-art technology according to Japanese Patent Application Publication No. 2007-195320 (JP-A-2007-195320), the abstract in the publication states "A geared motor 10G, obtained by disposing an electric motor 10 behind a speed reducing gear mechanism 11, is used as an in-wheel motor disposed at the lower part of a vehicle spring. The output shaft 10b of the electric motor 10 is made hollow to form an oil inlet path 15z, and a motor case 10a is housed in a cylindrical housing 10H to form a stator cooling path 10s. The stator cooling path 10s and the interior of the speed reducing gear mechanism 11 are made to communicate with each other through an oil passage 15s. Gear oil fed from an oil supplying device 30 provided in the vehicle body through a pipe 15a is discharged from the oil inlet path 15z into the speed reducing gear mechanism 11 to lubricate the gear of the speed reducing gear mechanism 11. Thereafter, the gear oil is guided from the oil passage 15s to the stator cooling path 10s to cool a stator coil 10c."

In short, in this related-art technology, oil is supplied from the oil supplying device 30 to gears of the speed reducing gear mechanism 11, and to a stator coil 10c of the electric motor 10.

By the way, this related-art publication does not minutely describe actions of the oil supplying device 30, which, in fact, are not understandable. Since the abstract of the publication describes that the oil supplying device 30 is provided at the vehicle body side, it is considered that the oil pump 31 is probably not driven by the electric motor 10 or the speed reducing gear mechanism 11, but is driven by a control system of the vehicle body side, or the like. Therefore, in this related-art technology, it is necessary to monitor the state of the speed reducing gear mechanism 11 or the electric motor 10 of the in-wheel motor system, and to control the oil pump 31 so that it is driven according to the state thereof. Therefore, the control in the related-art technology is not easy to perform, and makes a complicated apparatus configuration.

On another hand, in Japanese Patent Application Publication No. 2004-180477 (JP-A-2004-180477), its abstract states "The drive unit for the rear wheel of a hybrid vehicle comprises an oil catch tank 71 for storing oil splashed by the driven gear 39 of a differential gear from an oil sump 69 formed at the bottom part of a casing body 11, a slinger chamber 61 being supplied with oil from the oil catch tank 71, and a slinger 65 disposed in the slinger chamber 61 and driven by means of a motor 15 through gears 68 and 67. In order to cool the motor 15, oil is supplied gravitationally from the oil catch tank 71 to the oil passage 31a in a main shaft 31 communicating with the interior of the motor shaft and oil splashed by the slinger 65 from the slinger chamber 61 is also supplied."

In short, in this related-art technology, the oil splashed by the slinger 65 and the oil in the oil catch tank 71 are supplied to the motor 15 to cool it.

In the related-art technology of Japanese Patent Application Publication No. 2004-180477 (JP-A-2004-180477), the rotation direction of the driven gear 39 and the relative positional relationship between the driven gear 39 and the oil catch tank 71 are specifically determined so that the oil splashed by the driven gear 39 can be caused to enter the oil catch tank 71 when the driven gear 39 is rotating in the normal direction. Therefore, when the driven gear 39 is rotated in the reverse direction, it is impossible to cause oil to enter the oil catch tank 71.

Besides, in Japanese Patent Application Publication No. 2004-180477 (JP-A-2004-180477), oil is caused to flow into an inlet opening of the oil passageway 31a when the slinger 65 rotates in the normal direction. Hence, when the slinger 65 is rotated in the reverse direction by the motor 15, oil is caused to flow to a side away from the inlet opening of the oil passageway 31a, and therefore it is impossible to introduce oil into the oil passageway 31a.

Thus, it can be said that in the related-art technology of Japanese Patent Application Publication No. 2004-180477 (JP-A-2004-180477), oil can be supplied to the motor 15 to cool the motor 15 only when vehicle forward travel power is output, and that oil cannot be supplied to the motor 15 when vehicle backward travel power is output.

SUMMARY OF THE INVENTION

This invention, in a vehicle motive power transmission apparatus that transmits rotation power generated by a motive power source to the output side via a planetary gear device, makes it possible to supply oil at least to the planetary gear device not only when vehicle forward travel power is output, but also when vehicle backward travel power is output.

Besides, the invention makes it possible to reduce the resistance to the stirring of oil within an apparatus case both when vehicle forward travel power is output and when vehicle backward travel power is output.

A first aspect of the invention is a vehicle motive power transmission apparatus that includes: a planetary gear device via which rotation power generated by a motive power source is transmitted to an output side; an oil pump for sucking oil present in an apparatus case; a one-way clutch that transmits normal-direction rotation output of the planetary gear device to the oil pump, but does not transmit reverse-direction rotation output of the planetary gear device to the oil pump; an oil tank which is provided in the apparatus case, and which is provided with a first introduction portion that receives oil that is splashed upward as a gear in the apparatus case rotates in a normal direction, and a second introduction portion that receives oil that is splashed upward as the gear rotates in a reverse direction; and an oil passageway that supplies the planetary gear device with oil present in the oil tank or oil sucked by the oil pump.

The time of normal-direction rotation output of the planetary gear device and the time of normal-direction rotation of a gear refer to the time when the motive power transmission apparatus outputs vehicle forward travel power. Besides, the time of reverse-direction rotation output of the planetary gear device and the time of reverse-direction rotation of a gear refer to the time when the motive power transmission apparatus outputs vehicle backward travel power.

In this construction, at the time of normal-direction rotation output of the planetary gear device, that is, at the time of output of vehicle forward travel power by the motive power transmission apparatus, the one-way clutch locks and the oil pump is driven, so that the oil sucked up by the oil pump and the oil introduced into the oil tank will be supplied to the planetary gear device via the oil passageway.

On the other hand, at the time of reverse-direction rotation output of the planetary gear device, that is, at the time of output of vehicle backward travel power by the motive power transmission apparatus, the one-way clutch becomes free and therefore the oil pump is not driven, so that this oil pump does not supply oil to the planetary gear device. However, since oil in the apparatus case is splashed up and is therefore introduced into the oil tank even during the reverse-direction rotation of the gear, the oil thus provided in the oil tank is supplied to the planetary gear device via the oil passageway.

Thus, it becomes possible to supply oil to the planetary gear device without an interruption, not only during the output of vehicle forward travel power from the vehicle motive power transmission apparatus, but also during the output of vehicle backward travel power therefrom. Therefore, it becomes possible to suitably lubricate and cool the planetary gear device.

Furthermore, both during the output of vehicle forward travel power from the vehicle motive power transmission apparatus and during the output of vehicle backward travel power therefrom, oil in the apparatus case can be caused to enter the oil tank, and therefore the height of the liquid surface of oil in the apparatus case can be caused to be a low level. Therefore, it becomes possible to reduce the resistance of oil to the stirring by an appropriate gear in the apparatus case, which is advantageous in lessening the power transmission loss of the motive power transmission apparatus.

The planetary gear device may be constructed so that the rotation power generated by the motive power source is input to a sun gear, and is output from a ring gear; and the oil passageway may convey oil along a rotation axis of the ring gear, and may discharge oil radially outward from a radially inner side of the sun gear.

In this description of construction, the form in which the planetary gear device is used and the form in which the oil passageway is disposed are specifically determined, so that the path of power transmission from the planetary gear device to the oil pump and the path of conveyance of oil by the oil passageway become clarified.

The motive power source may be an electric motor, and the electric motor and the planetary gear device may be disposed side by side on an axis, and the oil passageway may convey oil along a rotation axis of the electric motor, and may discharge oil radially outward from a radially inner side of the electric motor.

In this description of construction, a concrete construction of the motive power source and a form in which the oil passageway is disposed are specifically determined, so that the path of power transmission from the planetary gear device to the oil pump and the path of conveyance of oil by the oil passageway become clarified. Besides, since it becomes possible to cool the electric motor by oil, this construction is advantageous in restraining excessive temperature rise of the motive power transmission apparatus.

The foregoing motive power transmission apparatus may further include a differential device that receives rotation power of a ring gear of the planetary gear device, and transmits rotation power to left and right wheels of the vehicle, and a gear that splashes the oil up may be a final ring gear of the differential device.

In this description of construction, the gear that splashes oil up is specifically determined, so that it becomes easy to understand a relative positional relationship between the ring gear of the planetary gear device and the final ring gear of the differential device in the apparatus case.

In the first aspect of the invention, it becomes possible to supply oil at least to the planetary gear device not only during the output of vehicle forward travel power but also during the output of vehicle backward travel power. Therefore, the motive power transmission apparatus of the first aspect of the invention is advantageous in improving the seizure resistance of the planetary gear device.

Besides the foregoing effect, the first aspect of the invention also makes it possible to make the height of the liquid surface of oil in the apparatus case as low as possible both during the output of vehicle forward travel power and during the output of vehicle backward travel power. Therefore, it becomes possible to reduce the resistance of oil to the stirring by the gear that splashes oil. Hence, the first aspect is advantageous in lessening the power transmission loss of the motive power transmission apparatus.

A second aspect of the invention is a vehicle motive power transmission apparatus that includes: a planetary gear device via which rotation power generated by a motive power source is transmitted to an output side; an oil pump that sucks up oil present in an apparatus case; a one-way clutch that transmits normal-direction rotation output of the planetary gear device to the oil pump, but does not transmit reverse-direction rotation output of the planetary gear device to the oil pump; an oil tank which is provided in the apparatus case, and which is provided with an oil introduction portion that receives oil that is splashed upward as a gear in the apparatus case rotates in a reverse direction; and an oil passageway that supplies the planetary gear device with oil present in the oil tank or oil sucked by the oil pump.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 2 is a sectional view of the transaxle of FIG. 1 that is taken from sideway, showing flow of oil occurring when vehicle forward travel power is output;

DETAILED DESCRIPTION OF EMBODIMENTS

Embodiments of the invention will be described in detail hereinafter with reference to the accompanying drawings.

Figure 1:
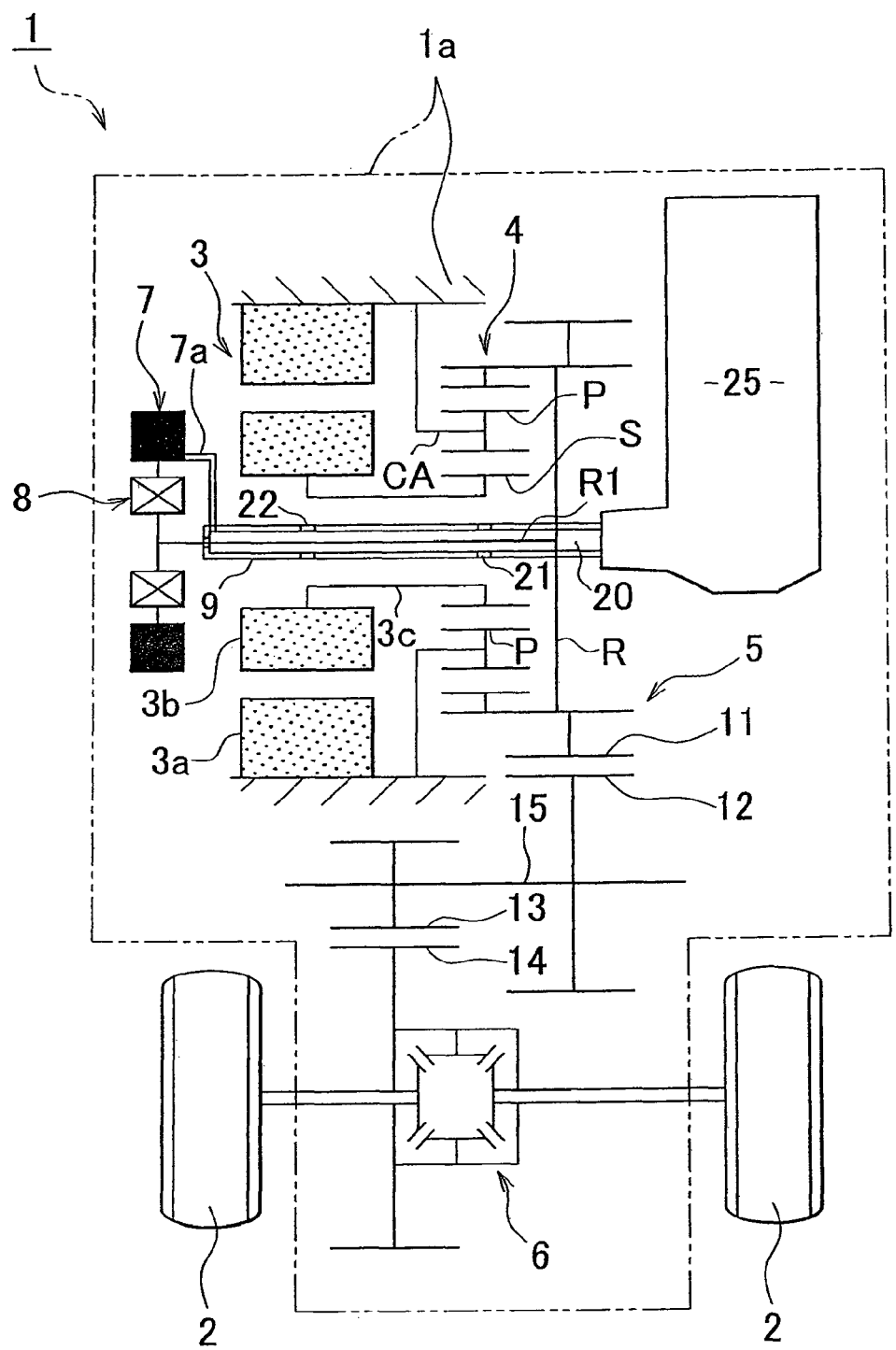
FIG. 1 is a skeleton diagram showing a general construction of a transaxle for use in an electric motor vehicle as an embodiment of a vehicle motive power transmission apparatus in accordance with the invention.
Figure 3:
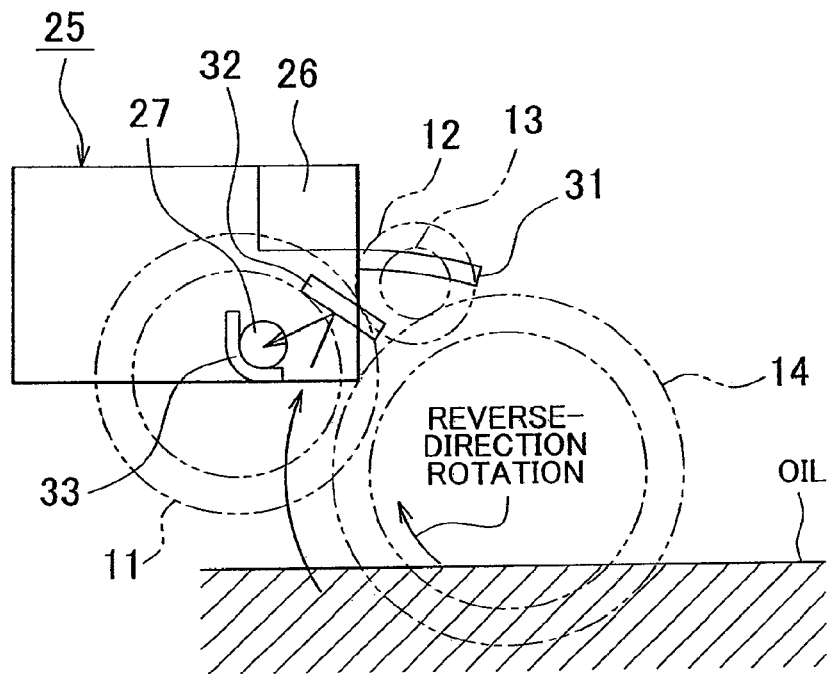
FIG. 3 is a sectional view of the transaxle of FIG. 1 that is taken from sideway, showing flow of oil occurring when vehicle backward travel power is output.

An embodiment of the invention is shown in FIG. 1 to FIG. 3. Firstly, a general construction of a transaxle for an electric motor vehicle which is an embodiment of the vehicle motive power transmission apparatus in accordance with the invention will be described.

In FIG. 1, a transaxle 1 and wheels 2 are shown. The transaxle 1 mainly includes an electric motor 3 as a motive power source, a planetary gear device 4, a speed reduction gear mechanism 5, and a differential device (final speed reducer) 6.

This transaxle 1 is constructed so as to transmit rotation power generated by the electric motor 3 to the differential device 6 via the planetary gear device 4 and the speed reduction gear mechanism 5, and transmit the rotation power from the differential device 6 to the wheels 2, 2 as forward travel drive force or reverse travel drive force.

The electric motor 3 includes a stator 3a that is unrotatably fixed to a case 1a of the transaxle 1, and a rotor 3b that is inserted at a radially inward side of the stator 3a so as to be freely rotatable in a non-contact manner.

The electric motor 3 is a synchronous electric motor that has at least a function of generating drive torque, and the torque that the electric motor 3 generates is adjusted by controlling an inverter via an electronic control unit (not shown), or the like. In addition, the electric motor 3 may also be constructed so as to carry out a function as an electricity generator as well, and the regenerative torque thereof is adjusted by the electronic control unit.

The planetary gear device 4 is a single planetary set, and mainly includes a sun gear S, a ring gear R, a plurality of planetary gears P, and a carrier CA. The planetary gears P are disposed in a space that extends in radial directions between the sun gear S and the ring gear R, in such a manner that the planetary gears mesh with the sun gear S and the ring gear R. The planetary gears P are supported by the carrier CA so as to be freely rotatable about their own axes while the positions of the planetary gears P relative to each other are maintained by the carrier CA.

A rotor shaft 3c of the electric motor 3 is linked to the sun gear S. A counter drive gear 11 of the speed reduction gear mechanism 5 is formed integrally with a radially outer side of the ring gear R. Besides, the ring gear R is linked to an oil pump 7. The carrier CA is fixed to the case 1a so as to be unrotatable. Thus, the sun gear S is provided as an input-side element, and the carrier CA is provided as a non-rotational element, and the ring gear R is provided as an output-side element, so that the planetary gear device 4 functions as a speed reducer.

The speed reduction gear mechanism 5 mainly includes the counter drive gear 11, a counter driven gear 12, a final drive gear 13, and a final ring gear 14.

The counter driven gear 12 and the final drive gear 13 are provided on one shaft 15 so as to be side by side in the axis direction. The counter drive gear 11 is in mesh with the counter driven gear 12, and the final drive gear 13 is in mesh with the final ring gear 14. Therefore, when the counter drive gear 11 rotates integrally with the ring gear R of the planetary gear device 4 as the ring gear R is rotated, rotation power is transmitted to the differential device 6 via the counter driven gear 12, the final drive gear 13 and the final ring gear 14.

The differential device 6 is a so-called double-pinion type differential, and transmits power input thereto from the final ring gear 14, to the left and right-side wheels 2, 2 while changing the distribution of power between the wheels 2, 2 as needed.

Oil as a lubricant is enclosed within the case 1a of the foregoing transaxle 1. The oil present at a bottom side in the case 1a is, for example, sucked by the oil pump 7 so as to be supplied to sites in the transaxle 1 which need to be lubricated, via an oil passageway 20, and is also utilized for cooling the electric motor 3, which is one of sites that need to be cooled.

Examples of the sites that need to be lubricated include meshed portions between gears in the planetary gear device 4 and the speed reduction gear mechanism 5, bearings (not shown), etc. Besides, the oil supplied to the sites that need to be lubricated is returned into the case 1a.

The oil pump 7 is linked to a center shaft R1 of the ring gear R of the planetary gear device 4, via a one-way clutch 8. That is, the one-way clutch 8 is disposed between a pump shaft (not shown) of the oil pump 7 and the center shaft R1 of the ring gear R.

The one-way clutch 8 locks to enter a state of transmitting rotation power from the ring gear R to the pump shaft of the oil pump 7 when the ring gear R rotates in a normal direction, that is, when vehicle forward travel power is output. When the ring gear R rotates in the reverse direction, that is, when vehicle backward travel power is output, the one-way clutch 8 becomes free to enter a state of not transmitting rotation power from the ring gear R to the pump shaft of the oil pump 7.

Due to this, only when the ring gear R rotates in the normal direction, that is, only when vehicle forward travel power is output, the oil pump 7 is driven so that oil in the case 1a is sucked up by the oil pump 7 so as to flow into the oil passageway 20.

The oil passageway 20 is a radially defined space formed between the center shaft R1 of the ring gear R and a hollow shaft 9 that is fitted at a radially outer side of the center shaft R1 with a predetermined clearance therebetween. An oil discharge pipe 7a of the oil pump 7 is linked to the oil passageway 20 that is formed by the radially defined space so that communication is provided between the oil discharge pipe 7a and the oil passageway 20. Thus, the oil sucked up by the oil pump 7 is supplied into the oil passageway 20.

A first oil hole 21 and a second oil hole 22 that are penetrating holes in radial directions are formed at appropriate positions on the hollow shaft 9 in the axis direction thereof. As for the first oil hole 21, oil is jetted radially outward from a radially inner side of the planetary gear device 4. As for the second oil hole 22; oil is jetted radially outward from a radially inner side of the electric motor 3.

As shown in FIG. 2 and FIG. 3, an oil tank 25 is provided within the transaxle 1 constructed as described above.

In short, the oil tank 25 is provided in order to cause a low-level height of the liquid surface of the oil enclosed within the case 1a of the transaxle 1 so that the resistance of oil to the stirring can be lessened and so that oil can be stably supplied to the foregoing sites that need to be lubricated or cooled.

The oil tank 25 is disposed in an upper location in the case 1a so as to receive oil that is splashed as the final ring gear 14 rotates. An oil outlet opening of the oil tank 25 is linked to the oil passageway 20 so that communication is provided therebetween.

The oil tank 25 is provided with a first introduction portion 26 that receives oil that is splashed when the final ring gear 14 rotates in the normal direction, and a second introduction portion 27 that receives oil that is splashed when the final ring gear 14 rotates in the reverse direction.

The first introduction portion 26 is an opening that is formed at an upper corner of the case 1a, and the second introduction portion 27 is a lateral hole that is formed in a side face of the case 1a. Oil guides 31, 32 and 33 are provided near the first and second introduction portions 26 and 27 in order to facilitate the inflow of oil.

The first oil guide 31 provided near the first introduction portion 26 collects oil that is splashed upward and guides the oil to the first introduction portion 26 of the oil tank 25, when the final ring gear 14 rotates in the normal direction.

Of the second and third oil guides 32 and 33 provided near the second introduction portion 27, the second oil guide 32 rebounds the oil splashed upward in a diagonally downward direction when the final gear 14 rotates in the reverse direction, and the third oil guide 33 collects the oil rebounded by the second oil guide 32, and guides the oil to the second introduction portion 27 of the oil tank 25.

Incidentally, when the final ring gear 14 rotates in the normal direction refers to when vehicle forward travel power is output. Besides, when the final ring gear 14 rotates in the reverse direction refers to when vehicle backward travel power is output.

Next, operations will be described.

Firstly, when the electric motor 3 generates normal-direction rotation power, the normal-direction rotation power is transmitted to the differential device 6 via the planetary gear device 4 and the speed reduction gear mechanism 5, so that the wheels 2, 2 are driven in the vehicle forward travel direction.

At this time, since the one-way clutch 8 locks as the ring gear R of the planetary gear device 4 rotates, rotation power of the ring gear R is transmitted to the oil pump 7, so that the oil pump 7 is driven. Therefore, oil in the case 1a is sucked up by the oil pump 7, and is thus supplied into the oil passageway 20.

Since the oil supplied into the oil passageway 20 is blown or sprayed from the first oil hole 21 toward the planetary gear device 4, lubrication or cooling is carried out on the gear mesh sites between component elements of the planetary gear device 4, slipping contact sites thereof, and various bearings. Besides, since the oil supplied to the oil passageway 20 is blown or sprayed from the second oil hole 22 toward the electric motor 3, the electric motor 3 is cooled.

By the way, during output of vehicle forward travel power, as the final ring gear 14 rotates in the normal direction, oil in the case 1 a is splashed in a counterclockwise direction as shown by bold-line arrows in FIG. 2, so that the oil is introduced into the oil tank 25 via the first oil guide 31 and the first introduction portion 26.

As a result, oil in the oil tank 25 is supplied into the oil passageway 20, and is therefore supplied to the planetary gear device 4 or the electric motor 3. Besides, the height of the liquid surface of oil in the case 1a becomes a low level, so that the resistance of oil to the stirring caused by the gears is lessened. The low level herein refers to an amount that minimizes the oil stirring resistance while securing sufficient supply of oil to the sites that need to be lubricated or cooled, and can be appropriately set on the basis of an experiment beforehand.

Incidentally, as oil continues to flow into the oil tank 25, the amount of oil reserved therein continues to increase. However, when an appropriate limit amount is exceeded, oil in the oil tank 25 overflows through the first and second introduction portions 26 and 27, and is thus discharged. Thus, the height of the liquid surface of oil in the oil tank 25 and the case 1a is kept substantially constant.

When reverse-direction rotation power is generated by the electric motor 3, the reverse-direction rotation power is transmitted to the differential device 6 via the planetary gear device 4 and the speed reduction gear mechanism 5, so that the wheels 2, 2 are rotationally driven in the backward travel direction of the vehicle.

At this time, as the ring gear R of the planetary gear device 4 rotates, the one-way clutch 8 becomes free, so that the rotation power of the ring gear R comes to not be transmitted to the oil pump 7. Therefore, since the oil pump 7 is not driven, oil in the case 1a is not sucked up by the oil pump 7.

However, during output of the vehicle backward travel power, as the final ring gear 14 rotates in the reverse direction, oil in the case 1a is splashed in the clockwise direction as shown by bold-line arrows in FIG. 3, so that oil is introduced into the oil tank 25 via the second and third oil guides 32, 33 and the second introduction portion 27.

Due to this, oil in the oil tank 25 is supplied into the oil passageway 20, so that oil is blown or sprayed from the first oil hole 21 toward the planetary gear device 4, and so that oil is blown or sprayed from the second oil hole 22 of the oil passageway 20 toward the electric motor 3. As a result, lubrication or cooling is carried out on the sites of slip contact between component elements of the planetary gear device 4, and bearings, so that the electric motor 3 is cooled. Furthermore, the height of the liquid surface of oil in the case 1a becomes a low level, so that the oil's resistance to the stirring by gears is lessened.

By the way, the oil blown or sprayed to the planetary gear device 4 or the electric motor 3 falls naturally to the bottom side of the case 1a. Therefore, during operation of the transaxle 1, oil is repeatedly supplied from the case 1a to the sites that need to be lubricated or cooled, via the oil pump 7, the oil tank 25 and the oil passageway 20.

As described above, in the embodiments to which features of the invention are applied, it is possible to supply oil to the planetary gear device 4 and the electric motor 3 not only during the output of vehicle forward travel power from the transaxle 1, but also during the output of vehicle backward travel power therefrom.

This makes it possible to appropriately lubricate and cool the planetary gear device 4, and becomes advantageous in improving the seizure resistance. Besides, since it becomes possible to appropriately cool the electric motor 3, it becomes possible to, for example, efficiently manage the temperature of the electric motor 3 without a need to use a special motive power source or a special cooling device.

Furthermore, either during the output of vehicle forward travel power from the transaxle 1 or during the output of vehicle backward travel power therefrom, oil in the case 1a is able to be caused to enter the oil tank 25 so as to reduce the height of the liquid surface of oil in the case 1a to a low level. This is advantageous in lessening the power transmission loss of the transaxle 1 by, for example, making it possible to reduce the resistance of the oil in the case 1a to the stirring thereof caused mainly by the final ring gear 14, etc.

Incidentally, the invention is not limited only to the foregoing embodiments, but can be carried out with various modifications or applications that are encompassed within the scope of the invention defined by the appended claims for patent or within a scope equivalent to the scope defined by the claims.

(1) Although the foregoing embodiments have been described in conjunction with an example in which the motive power source is solely the electric motor 3, the invention is not limited so. For example, the motive power source may be provided in a form in which two electric motors are used in combination, a form in which the motive power source is an internal combustion engine, or a form in which an internal combustion engine and an electric motor are used in combination.

(2) Although the foregoing embodiments have been described in conjunction with an example in which the planetary gear device 4 is of a single-planetary type, the invention is not limited so. For example, the planetary gear device 4 may also be of double-planetary type.

(3) Although the foregoing embodiments have been described in conjunction with an example in which the final ring gear 14 is adopted as a gear for splashing up oil so as to cause oil to enter the oil tank 25 when vehicle forward travel power or vehicle backward travel power is output, the invention is not limited so. For example, it is also possible to adopt a configuration as shown in FIG. 4 in which the final ring gear 14 is used as a gear for splashing oil so that the oil enters the oil tank 25 when vehicle forward travel power is output, and the final ring gear 14 and the counter drive gear 11 are used as gears for splashing oil so that the oil enters the oil tank 25 when vehicle backward travel power is output.

Figure 4:
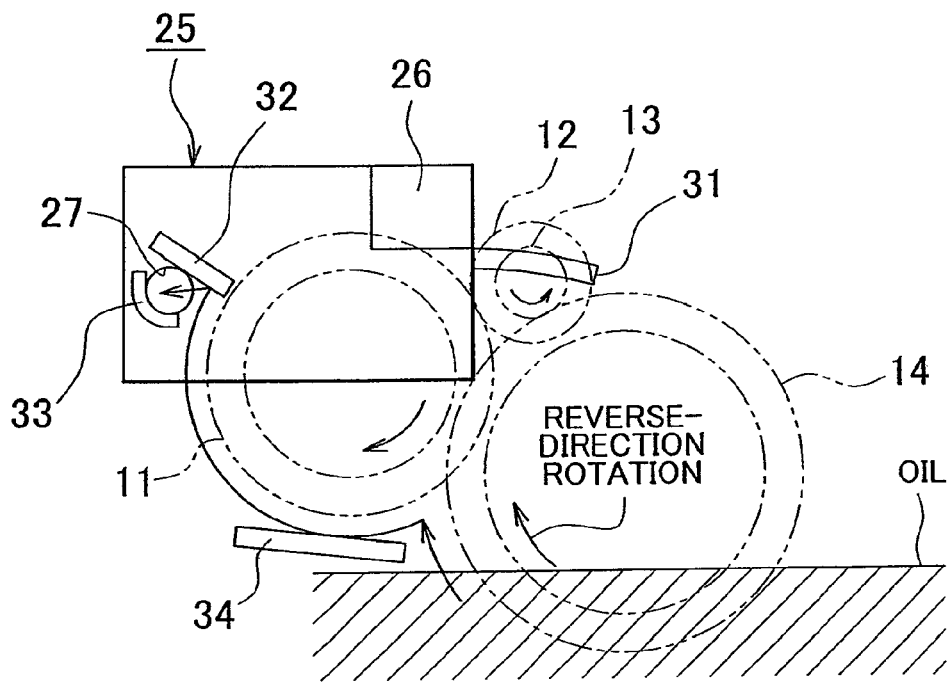
FIG. 4 is a diagram of another embodiment of the invention which corresponds to the diagram of FIG. 3.

In this configuration, a fourth oil guide 34 is provided under the counter drive gear 11 as shown in FIG. 4. This fourth oil guide 34 is provided for the purpose of collecting oil splashed during the reverse-direction rotation of the final ring gear 14, that is, during the output of vehicle backward travel power, to a region under the counter drive gear 11.

As a result, when the final ring gear 14 rotates in the reverse direction, the oil splashed upward by the final ring gear 14 is collected between a region under the counter drive gear 11 and the fourth oil guide 34. Then, the collected oil, as the counter drive gear 11 rotates, is splashed upward in the clockwise direction as shown by bold-line arrows in FIG. 4, so that the oil is collected by second and third oil guides 32 and 33, and is introduced into the second introduction portion 27 of the oil tank 25.

Thus, the gear or gears for introducing oil in the case 1a into the oil tank 25 are not particularly limited.

Figure 5:
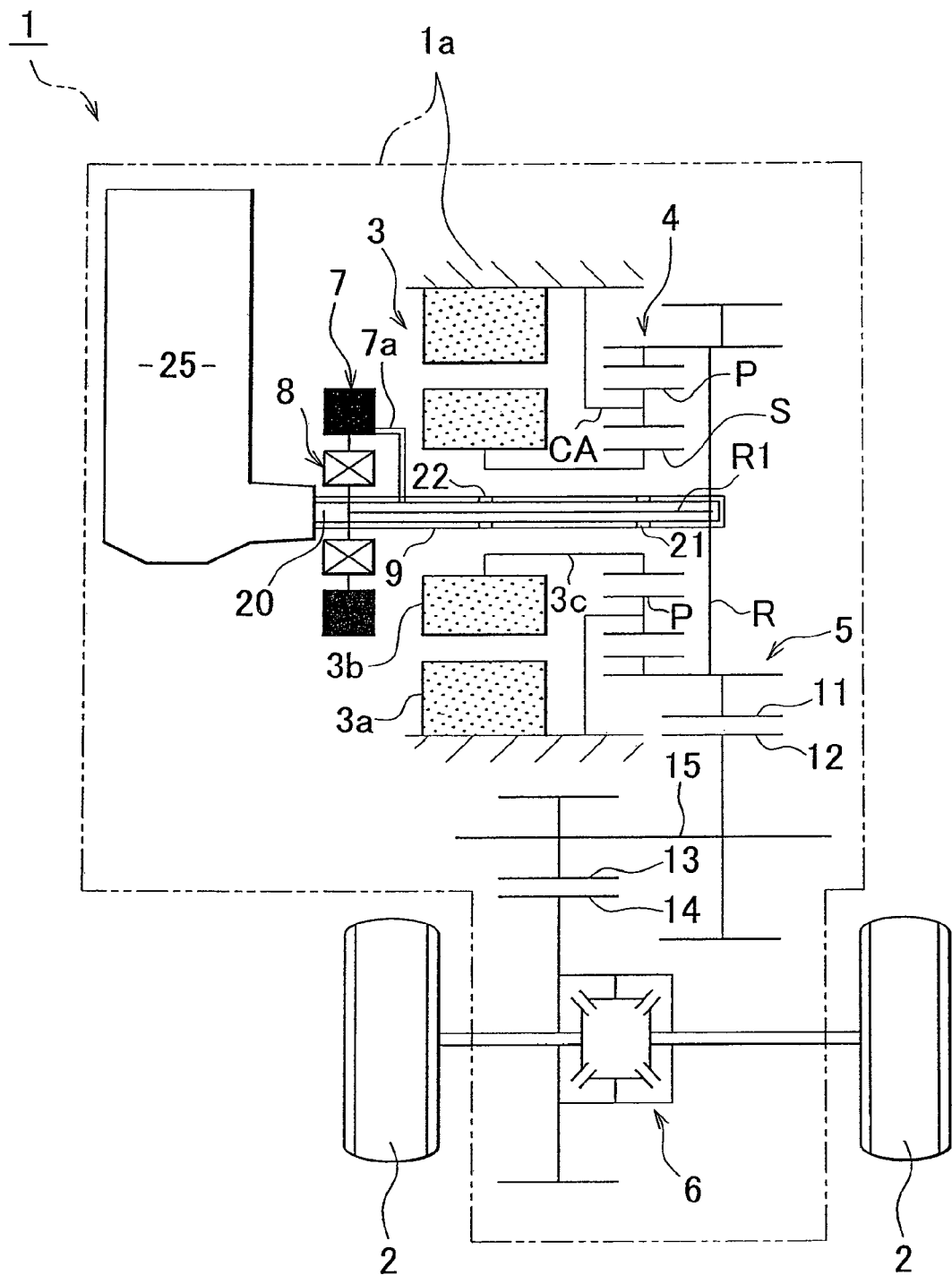
FIG. 5 is a diagram of the another embodiment of the invention which corresponds to the diagram of FIG. 1.

(4) Although the foregoing embodiments have been described in conjunction with an example in which the oil pump 7 and the oil tank 25 have a positional relationship in which the oil pump 7 and the oil tank 25 are disposed at opposite sides of the planetary gear device 4 in the left-right direction, the invention is not limited so. For example, it is also possible to adopt a positional relationship as shown in FIG. 5 in which the oil pump 7 and the oil tank 25 are both disposed at a side of the planetary gear device 4, and the oil tank 25 is disposed at an outer side of the oil pump 7. If this positional relationship between the oil pump 7 and the oil tank 25 is adopted, it is also possible to form a configuration that achieves substantially the same operation and effects as the foregoing embodiments.

The invention claimed is:

1. A vehicle motive power transmission apparatus comprising:
   a planetary gear device via which rotation power generated by a motive power source is transmitted to an output side;
   an oil pump for sucking oil present in an apparatus case;
   a one-way clutch that transmits normal-direction rotation output of the planetary gear device to the oil pump, but does not transmit reverse-direction rotation output of the planetary gear device to the oil pump;
   an oil tank which is provided in the apparatus case, and which is provided with a first introduction portion that receives oil that is splashed upward as a gear in the apparatus case rotates in a normal direction, and a second introduction portion that receives oil that is splashed upward as the gear rotates in a reverse direction; and
   an oil passageway that supplies the planetary gear device with oil present in the oil tank or oil sucked by the oil pump.

2. The motive power transmission apparatus according to claim 1, wherein the planetary gear device is constructed so that the rotation power generated by the motive power source is input to a sun gear, and is output from a ring gear, and the oil passageway conveys oil along a rotation axis of the ring gear, and discharges oil radially outward from a radially inner side of the sun gear.

3. The motive power transmission apparatus according to claim 1, wherein the motive power source is an electric motor, and the electric motor and the planetary gear device are disposed side by side on an axis, and the oil passageway conveys oil along a rotation axis of the electric motor, and discharges oil radially outward from a radially inner side of the electric motor.

4. The motive power transmission apparatus according to claim 1, further comprising:
   a differential device that receives rotation power of a ring gear of the planetary gear device, and transmits rotation power to left and right wheels of the vehicle, wherein a gear that splashes the oil up is a final ring gear of the differential device.

5. The motive power transmission apparatus according to claim 1, further comprising:
   an oil guide that guides oil to the second introduction portion.

6. A vehicle motive power transmission apparatus comprising:
   a planetary gear device via which rotation power generated by a motive power source is transmitted to an output side;
   an oil pump that sucks up oil present in an apparatus case;
   a one-way clutch that transmits normal-direction rotation output of the planetary gear device to the oil pump, but does not transmit reverse-direction rotation output of the planetary gear device to the oil pump;
   an oil tank which is provided in the apparatus case, and which is provided with an oil introduction portion that receives oil that is splashed upward as a gear in the apparatus case rotates in a reverse direction; and
   an oil passageway that supplies the planetary gear device with oil present in the oil tank or oil sucked by the oil pump.

7. The motive power transmission apparatus according to claim 6, further comprising:
   an oil guide that guides oil to the oil introduction portion.

* * * * *